United States Patent [19]

Bridges et al.

[11] Patent Number: 4,929,872
[45] Date of Patent: May 29, 1990

[54] LIGHT BULB SOCKET SOFT START AND POWER INTERRUPT ASSEMBLY

[75] Inventors: Mark E. Bridges, Spencerport; Robert W. Easterly, Churchville, both of N.Y.

[73] Assignee: Eastman Kodak Company, Rochester, N.Y.

[21] Appl. No.: 142,629

[22] Filed: Jan. 11, 1988

[51] Int. Cl.$^5$ .................... H05B 37/02; H05B 39/04
[52] U.S. Cl. .................... 315/209 R; 315/225; 315/362; 307/326; 307/328
[58] Field of Search ................ 313/313, 318; 315/209 R, 225, 362, DIG. 7; 307/326, 328; 328/7

[56] References Cited

U.S. PATENT DOCUMENTS

| | | | |
|---|---|---|---|
| 3,243,689 | 3/1966 | Perrins | 323/22 |
| 3,544,950 | 12/1970 | Lopez et al. | 339/17 |
| 3,555,341 | 1/1971 | Curtis | 313/318 |
| 4,008,403 | 2/1977 | Rose | 307/113 |
| 4,076,358 | 2/1978 | Taormina et al. | 339/17 |
| 4,152,622 | 5/1979 | Fitzgerald | 313/318 |
| 4,163,923 | 8/1979 | Herbers et al. | 315/208 |
| 4,439,820 | 3/1984 | Kuhn et al. | 363/21 |
| 4,580,088 | 4/1986 | Bloomer | 323/238 |
| 4,621,313 | 11/1986 | Kiteley | 363/49 |

Primary Examiner—Eugene R. LaRoche
Assistant Examiner—Ali Neyzari
Attorney, Agent, or Firm—James A. Smith

[57] ABSTRACT

A mounting assembly for a light bulb includes a soft start-up circuit as well as a DC-to-AC converter in order to prolong bulb life. In addition, the mounting assembly includes a removable socket to facilitate changing the bulb. When the socket is rotated from an "engaged" position for removal, an interlock causes power to be interrupted at a remote location from the mounting assembly. In addition, conducting portions of the mounting assembly are remotely located to reduce the possibility of accidental contact during socket installation and removal.

20 Claims, 6 Drawing Sheets

LIGHT BULB SOCKET SOFT START AND POWER INTERRUPT ASSEMBLY

TECHNICAL FIELD

The present invention pertains to a light bulb mounting assembly having soft start and power interrupt capabilities; and more particularly to a light bulb mounting assembly having a removable socket which interrupts power to the assembly when the socket is removed for replacement of the bulb.

BACKGROUND OF THE INVENTION

In photographic equipment such as film projectors, one or more light bulbs are used to illuminate an image for display. Occasionally, however, the bulb will burn out and require changing. It is common practice when changing the bulb to terminate power to the equipment in order to prevent accidental shock.

Furthermore, it is desirable to maximize the operating life of the bulb. It is known that a significant reduction in bulb life occurs during start-up when power is first applied to the bulb. This is because significant shock to the bulb filament occurs due to the initial surge of current reaching the filament when the light bulb is turned on.

A number of conventional apparatus for reducing an initial surge of current to a downstream load have been disclosed. For example, soft start circuits are described in U.S. Pat. No. 4,580,088 by Bloomer; as well as in U.S. Pat. No. 4,621,313 by Kiteley; and U.S. Pat. No. 3,243,689 by Perrins. Furthermore, variable duty cycle circuits have been described in U.S. Pat. No. 4,163,923 by Herbers et al; and in U.S. Pat. No. 4,439,820 by Kuhn et al.

In addition, a number of conventional light bulb socket assemblies have been disclosed. For example, various light bulb socket assemblies used in conjunction with printed circuit boards have been described in U.S. Pat. No. 4,152,622 by Fitzgerald; as well as in U.S. Pat. No. 4,076,358 by Taormina et al; in U.S. Pat. No. 3,555,341 by Curtis; and in U.S. Pat. No. 3,544,950 by Lopez et al.

SUMMARY OF THE INVENTION

The present invention pertains to a light bulb mounting assembly which has a soft start capability as well as a DC-to-AC conversion capability to increase bulb life, and which utilizes an interlock feature to interrupt power to the mounting assembly when the bulb is being replaced.

In an exemplary embodiment there is provided apparatus which is comprised of a mounting assembly for a light bulb, including socket means for supporting the light bulb, as well as means for holding the socket means to permit movement of the socket means between an engaged position where an electrical circuit is completed between the holding means and the socket means, and a disengaged position where the electrical circuit is not completed.

There is also provided means for interrupting a signal, as well as means for generating a signal. The signal generating means includes first signal means for supplying a first drive signal via the signal interrupt means to the holding means for activating the light bulb through the completed circuit when the socket means is in the engaged position. In addition, second signal means are provided for supplying a second signal to the signal interrupt means when the socket means is in the disengaged position in order to interrupt the drive signal at the signal interrupt means and to prevent it from reaching the mounting assembly.

It is therefore an object of the present invention to provide for a light bulb mounting assembly and circuit in which power to the mounting assembly is interrupted when the socket is disengaged.

BRIEF DESCRIPTION OF THE DRAWINGS

These and other objects and advantages of the present invention will become more readily apparent upon reading the following detailed description in conjunction with the attached drawings in which:

FIG. 3B is an elevated sectional view taken through the light bulb and engaging electrical contacts;

DETAILED DESCRIPTION OF THE INVENTION

Figure 1:
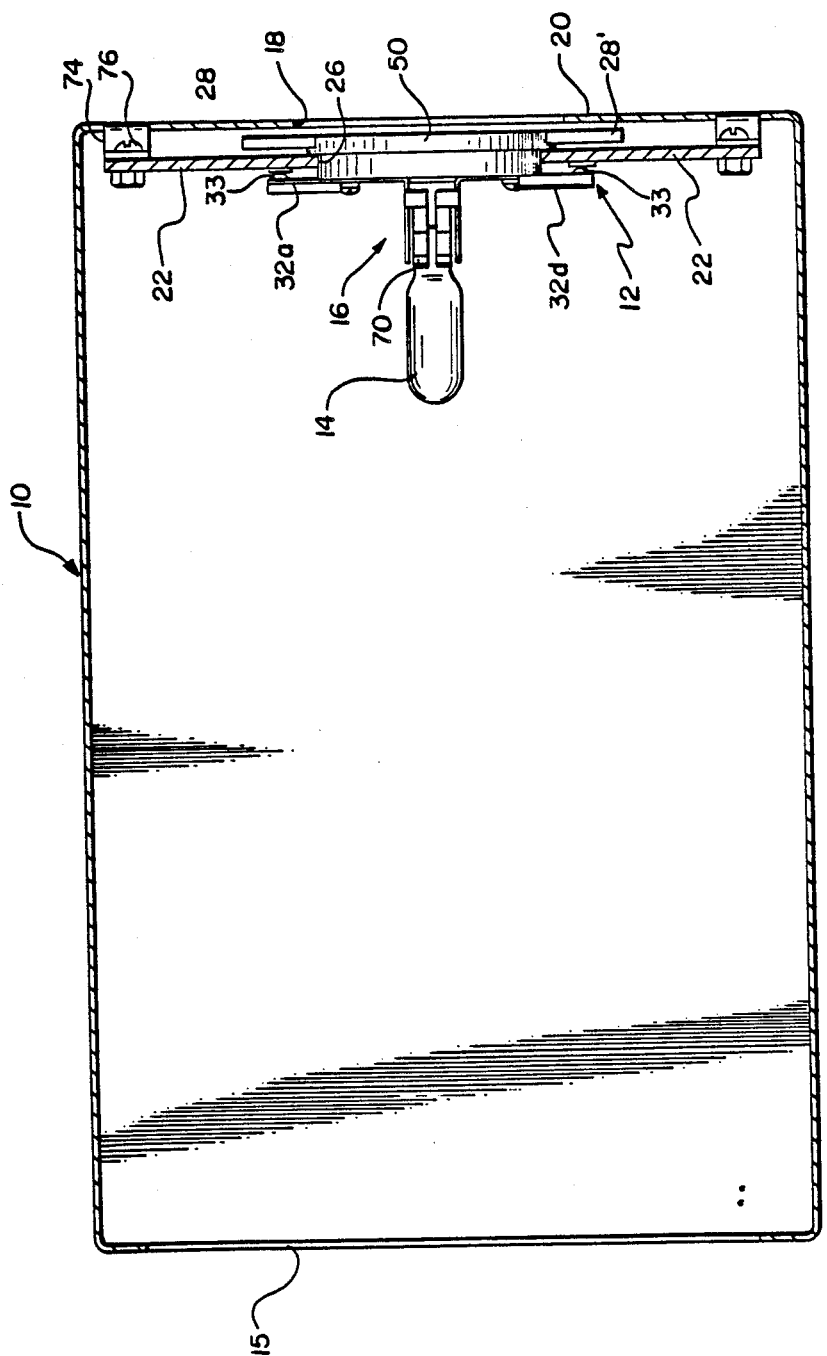
FIG. 1 is a side sectional view of a light box containing a light bulb socket and holder of the present invention.

By means of an introduction and by referring first to FIG. 1 there is shown a light box indicated at 10 containing a light bulb mounting assembly indicated at 12 which in turn supports a conventional wedge base light bulb 14. In an exemplary embodiment the light bulb 14 illuminates an image contained on a film carrier (not shown) through an opening in a left end 15 of the box.

Figure 2:
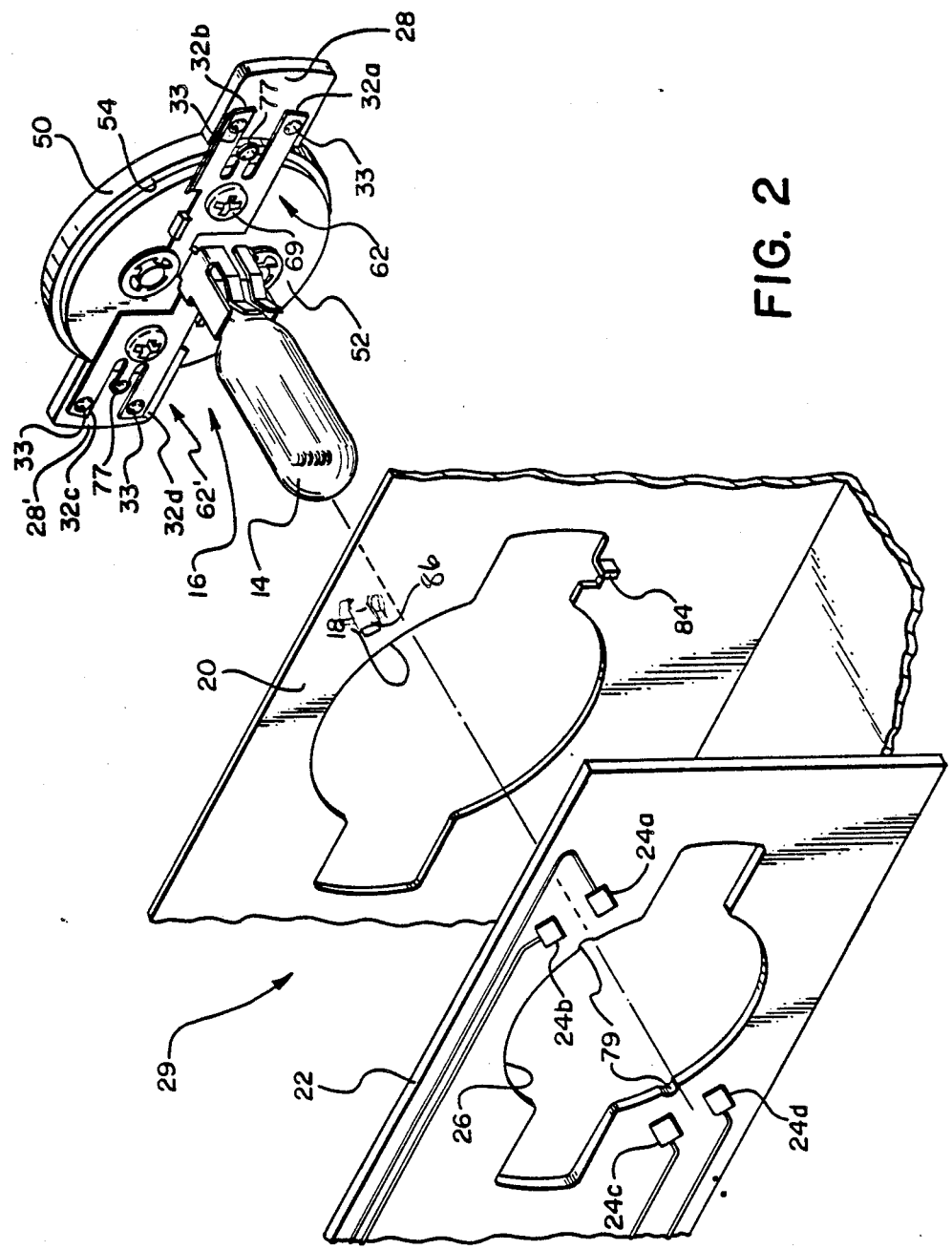
FIG. 2 is an exploded isometric view of the light bulb socket and holder of the present invention.

As shown more clearly in FIG. 2, the mounting assembly includes a socket 16 which is inserted through an opening 18 in a right wall 20 of the light box. Located at a slightly spaced apart location from the inside surface of the right wall 20 is a printed circuit board 22 which contains four electrical contact pads 24a through d on its left surface and which are located about an opening 26 in the circuit board. When the socket 16 is inserted through the right wall opening 18, it is rotated in a counterclockwise direction (when viewing FIG. 2) so that radially extending wings 28 of the socket 16 are located in a gap 29 between the right side of the board 22 and light box right wall 20. This prevents the socket from being pulled out of the box in an axial direction. In addition, there are raised electrical contact prongs 32a through d, attached to the socket 16 and having dimples 33, which are caused to rotate into engagement with the contact pads 24a through d to complete an electrical circuit to the light bulb. More specifically, as shown in FIG. 1 the contact prongs 32 are retained above the wings 28 by a distance approximately equal to the thickness of the board 22 so that the dimples 33 on prongs 32 are brought into resilient engagement with the contact pads 24 when the socket is rotated into an "engaged" position.

Figure 4:
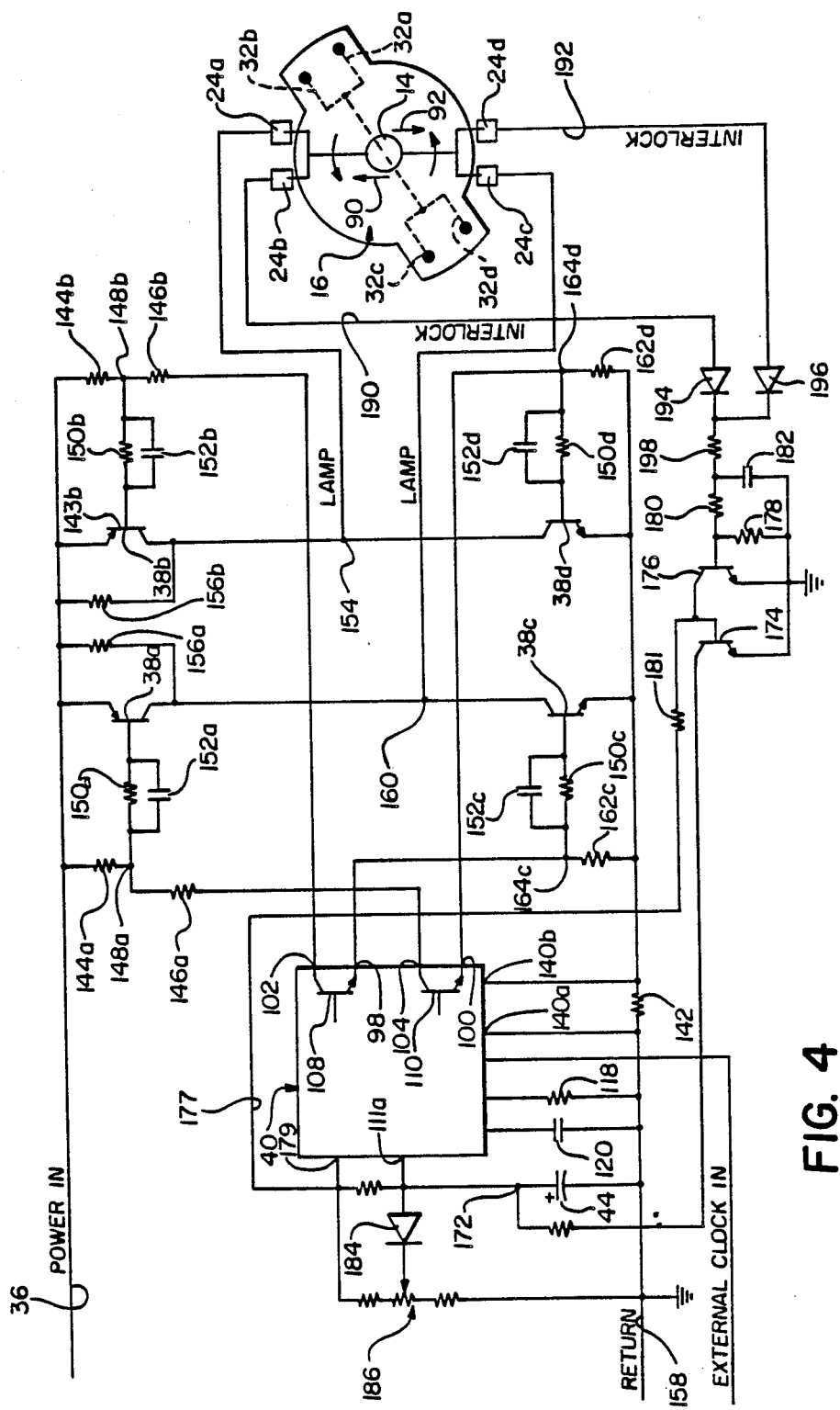
FIG. 4 is a diagram of the circuit used in conjunction with the light bulb socket and holder for achieving a soft start as well as a power interrupt capability.

Soft starting of the bulb 14 is achieved by means of the circuit shown in FIG. 4. Briefly, when the socket 16 (shown schematically at the right side of FIG. 4) is rotated in a counterclockwise direction from a "disengaged" position shown in dashed lines, to an "engaged" position shown in solid lines, dimples 33 on socket prongs 32a, 32b engage contact pads 24a, 24b, thereby completing an electrical path between pads 24a and 24b; while at the same time dimples 33 on prongs 32c, 32d engage pads 24c, 24d completing an electrical path between pads 24c and 24d. It should be apparent therefore that a slight clockwise rotation of the socket 16 from the "engaged" position interrupts the electrical connection between pads 24a and 24b as well as between pads 24c and 24d, thereby providing the power interrupt feature of the present invention in a manner to be described in greater detail later. In addition when the socket assembly is in the "engaged" position, electrical contact is established between contact pads 24a and 24c, as well as between pads 24b and 24d. These connections provide current for lighting the bulb in a manner also to be described in greater detail later.

Figure 5:
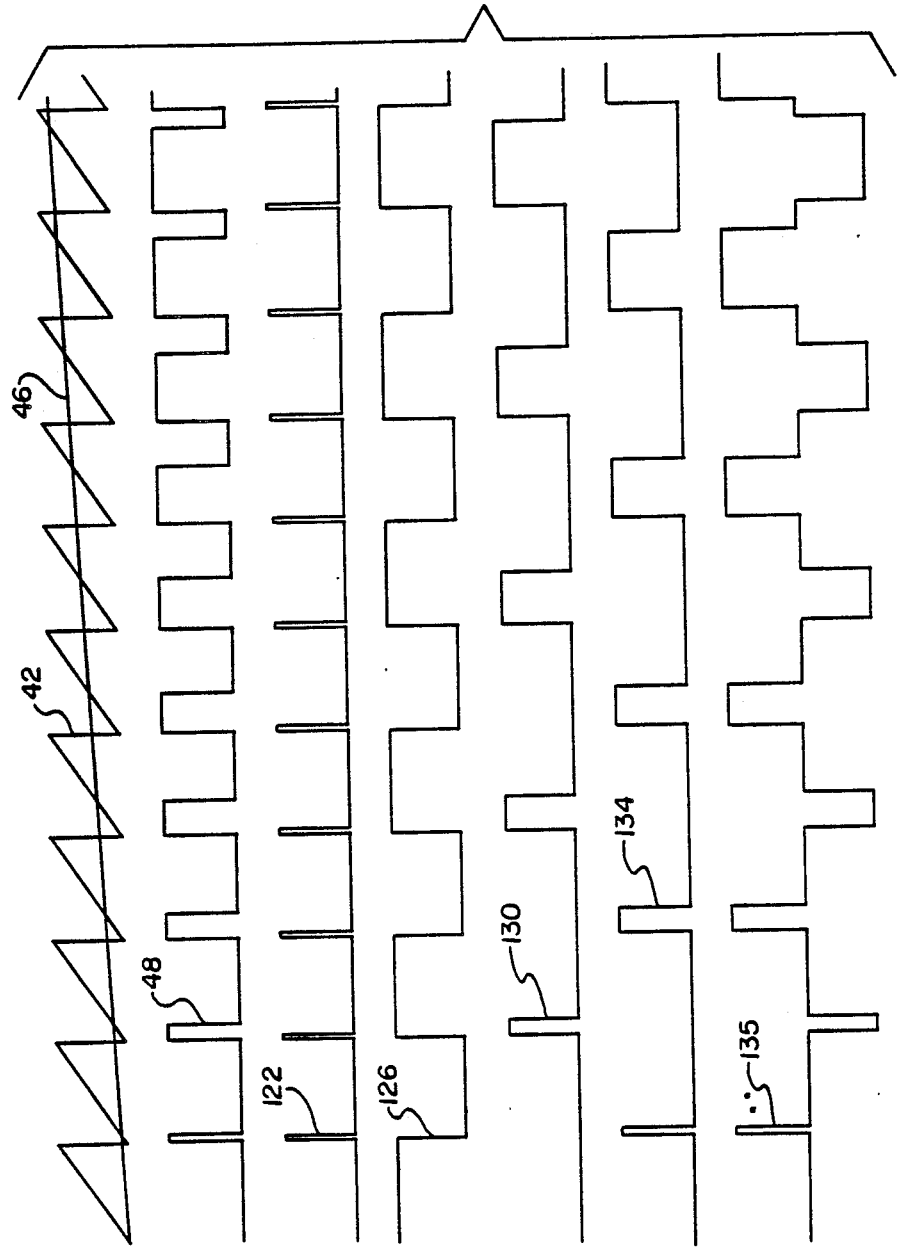
FIG. 5 is a diagram showing various signals generated internally and externally by a conventional pulse width modulator to achieve soft start operation.

With regard to soft start, the rotation of the socket into the "engaged" position allows current to flow from an input line 36 (FIG. 4) through transistor switches 38a through d to the bulb 14 via the prongs 32 and mounting assembly. The switches 38 are controlled by a pulse width modulator circuit 40 which controls the operation of the switches 38 so as to slowly increase the "on" time of the bulb 14 as power is initially applied to the bulb. More specifically, in an exemplary embodiment, pulse width modulator 40 generates an internal sawtooth waveform identified by the number 42 in FIG. 5. Rotation of the socket 16 to the "engaged" position and completion of the electrical circuit allows a capacitor 44 (FIG. 4) which is connected to the modulator 40 to charge up. This in turn generates a ramping waveform 46 shown in FIG. 5, and which is compared with the sawtooth waveform by the modulator 40 to generate a modulated output identified by the number 48 in FIG. 5. It is apparent from FIG. 5 that as the capacitor 44 charges up, the duty cycle of output pulses 48 increase, thereby increasing the "on" time of the bulb and providing its soft start capability. Rotation of the socket 16 from the "engaged" position causes the electrical connection to be broken between pad 24a and 24b as well as between pads 24c and 24d, resulting in the discharge of capacitor 44. This in turn interrupts power to the mounting assembly.

It is a further feature of the present invention that the capacitor 44 (FIG. 4) is not allowed to charge up until the socket 16 is in the "engaged" position. In this mode the switches 38 are not closed, and current does not reach the mounting assembly. Furthermore, the conducting portions (left sides) of the printed circuit board 22 (FIG. 1) and mounting assembly face away from the light box opening 18 as well as from the grasping surfaces of the socket so as to minimize human contact with the conducting portions when removing and reinstalling the socket 16.

Figure 3:
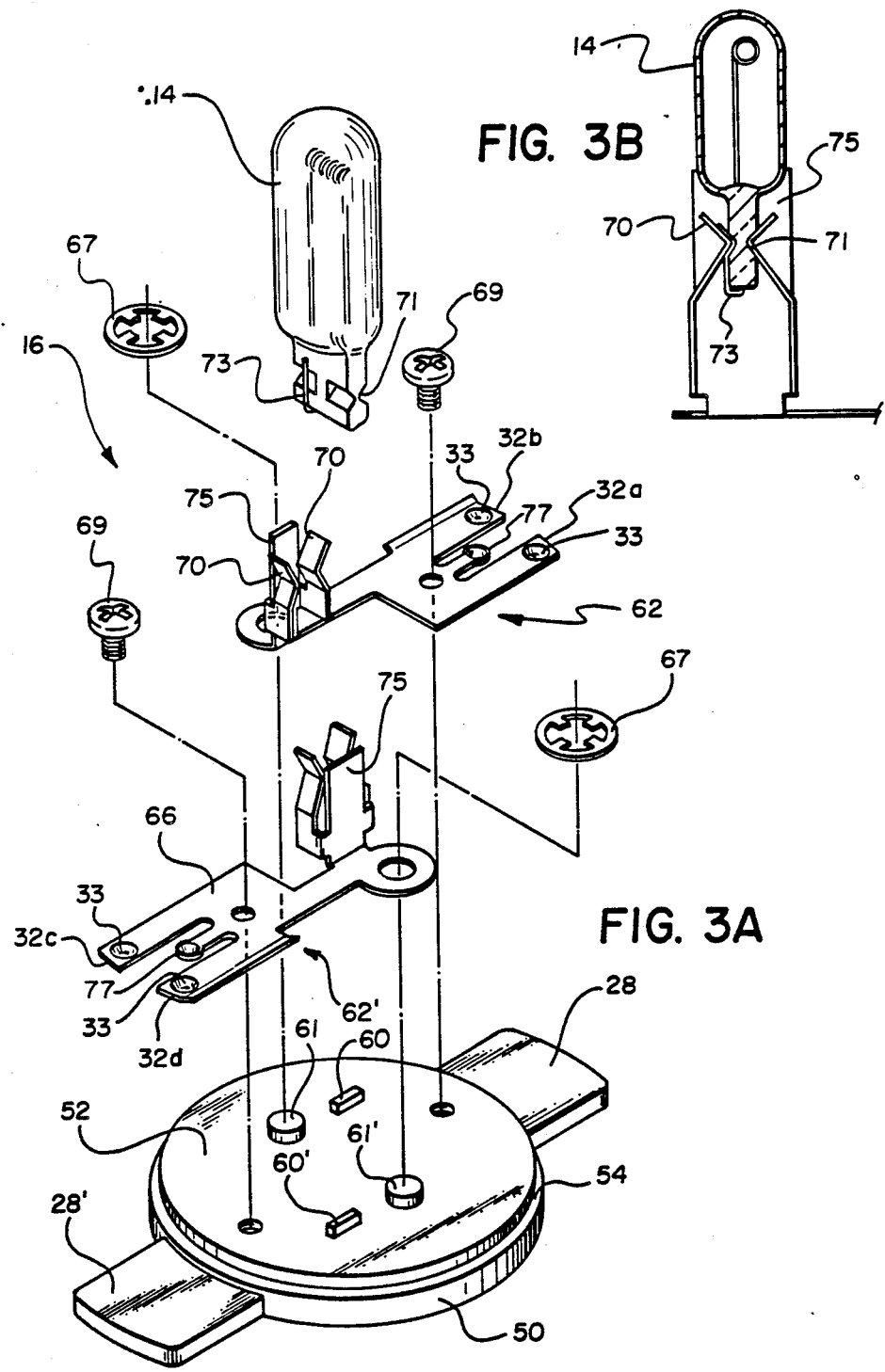
FIG. 3A and FIG. 3B are an exploded isometric view of the light bulb socket of the present invention.

Having provided a brief introduction to the present invention, a more detailed description will now be provided. Referring first to the mounting assembly 16 shown in FIG. 3A, the socket is formed by a round base 50 to which there is integrally connected at opposing sides of the base 50 the aforementioned wings 28, 28' which are characterized by their rectangular shapes. Integral with and located atop the base 50 is a round platform 52 which has a slightly smaller radius than the base 50 so that an outlying portion of the base 50 forms a lip 54. The platform 52 includes raised locating bosses 60, 60' as well as upstanding pins 61, 61' at its opposing ends for engaging electrical contacts 62, 62'. The contacts 62, 62' each include (i) a horizontal portion 66, which is positioned relative to the platform 52 by the respective locating boss 60 as well as by the respective upstanding pin 61, and which is retained thereon by a retainer 67 and by a screw type fastener 69, and (ii) a pair of upstanding fingers 70 (FIG. 3B) which are formed in a manner to engage notches 71 and a conductive terminal 73 of the light bulb 14 in a compressive manner thereby providing support for the bulb as well as a current path to light the bulb, and (iii) bulb support tabs 75 which project upwardly from the upper surface of the horizontal portion 66 and provide lateral support to the light bulb 14. Also projecting horizontally from the opposite end of the horizontal portion 66 is the aforementioned pair of electrical prongs 32. That is, the prongs 32a, 32b extend over and above the upper surface of the wing 28 in a parallel manner, while the prongs 32c, 32d extend over and above the upper surface of the wing 28'. Located between each pair of prongs is a retention tab 77 for holding the socket in place in a manner to be described later.

In order to hold the socket 16, the light box 10 (FIG. 1) includes a number of leftward extending mounts 74 which are integrally connected to the inside surface of the right wall 20. The printed circuit board 22 is connected in a vertical manner to these mounts by fasteners 76 which extend through holes in the circuit board. To facilitate insertion of the socket 16, the openings 18, 26 in the wall 20 and board 22 all have shapes which are complementary in shape to, but slightly larger than, socket 16. That is, each opening has a round portion with rectangular wing portions at opposite ends. Furthermore, the openings 18, 26 are aligned with each other so that upon insertion of the socket through the opening 18 (FIG. 2) into the space 33 between the wall 20 and board 22, the prongs 32 extend through the circuit board opening 26 and engage the left side of the board 22. More precisely, the board opening 26 has a slightly smaller radius than the wall opening 18 so that during the insertion of the socket, the lip 54 of the socket base engages the right side of the board 22 to prevent further insertion; while the prongs 32, fingers 70, support tabs 75, and light bulb 14 extend through the board opening 26 into the light box 10. In addition, after clockwise rotation of the socket, dimpled portions of the retention tabs 75 drop into a pair of slots 79 which are located about the perimeter of the opening 26 on the circuit board 22. The retention tabs also provide tactile feedback to the user by indicating that the socket is in the correct position for use and that it need not be rotated further into position. However, should rotation of the socket continue, it is limited by a first tab 84 which extends (when viewing FIG. 2) from the left surface of the wall 20 at a location adjacent a lower edge of the right wing opening, and a second tab 86 which extends from the left surface of the wall 20 at a location above the round portion of the opening 18. In this manner the tab 84 prevents unwanted counterclockwise rotation of the socket assembly during insertion, and the tab 86 limits the maximum clockwise rotation during insertion so that the prongs 32 properly align with the contact pads 24 in the "engaged" position. In order to achieve this alignment, contact pads 24a and 24b (FIG. 2) are located side-by-side next to the upper edge of the opening 26, and the contact pads 24c and 24d are located side-by-side next to the lower edge of the opening. In this manner, when viewing FIG. 2 pad 24a occupies a two o'clock position, pad 24b a one o'clock position, pad 24c an eight o'clock position, and pad 24d a seven o'clock position. When socket 16 is inserted and rotated into the "engaged" position, dimples 33 on prongs 32b and 32d (FIG. 4) wipe across pads 24a and 24c respectively; however not until after (i) pads 24a and 24b make electrical contact and (ii) pads 24c and 24d make electrical contact, is any substantial current permitted to reach the socket. It should be appreciated that insertion of the socket may be conveniently accomplished by grasping the socket 16 by the base portion 50 (FIG. 1) and then by inserting the socket through the opening 18 and rotating it clockwise when viewed axially from a point to the right of the right wall 20 in FIG. 1. Removal of the socket may be accomplished by simply reversing this procedure, with the first tab 84 limiting overrotation of the socket 16 in the counterclockwise direction.

Turning our attention now to the details of the circuit shown in FIG. 4, transistors 38a through d are provided to not only accomplish the soft starting operation, but also in an exemplary embodiment, they are provided to convert a direct current (DC) signal, fed along the input line 36 from a conventional upstream power source (not shown), to an alternating (AC) signal. This DC-to AC conversion is accomplished by first turning on transistors 38a and 38d, while turning off transistors 38b and 38c. In this manner a current path is provided through the bulb 14 in the direction of an arrow identified by the number 90. On the other hand, the AC cycle is completed by turning transistors 38a and 38d off, and turning transistors 38b and 38c on, so that a current path (identified by an arrow with the number 92) is generated through the bulb 14. Thus by cycling transistor pairs 38a, 38d, and 38b, 38c, on and off, a DC-to-AC conversion is accomplished which will prolong bulb life.

Figure 6:
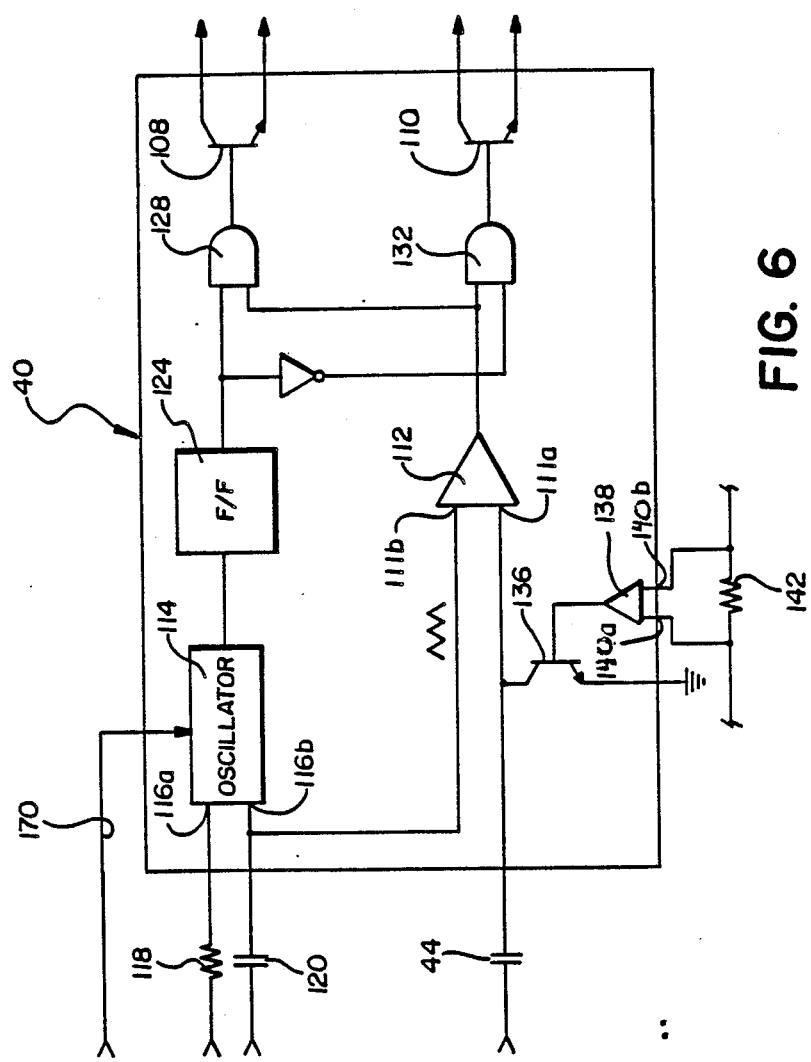
FIG. 6 is a simplified diagram of the conventional pulse width modulator circuit which is utilized in an exemplary embodiment of the present invention.

As mentioned briefly before, control of the transistors 38 (FIG. 4) is accomplished by the modulator circuit 40 which in an exemplary embodiment is a pulse width modulator chip referred to as an SMPS Control Circuit SG3524 manufactured by Signetics, and which is described beginning at page 7-52 of the Signetics data manual dated 1985. More specifically, the modulator chip includes emitter pins 98, 100, as well as collector pins 102, 104. In order to better understand the present invention, reference is made to FIG. 6, which is a simplified diagram of the modulator chip, as well as to the timing diagram of FIG. 5. In order to achieve a soft start capability, the external charging capacitor 44 is tied to an input 111a of an internal comparator 112 for receiving the ramping signal 46 The modulator includes an oscillator 114 which has an input 116a tied to an external resistor 118, with its other input 116b being tied to an external capacitor 120. The oscillator uses the resistor 118 to establish a constant charging current into the capacitor 120. This charging current provides a linear ramp voltage on the capacitor which forms the sawtooth waveform 42 (FIG. 5) to provide a reference signal to the input 111b of the comparator 112. A second output from the oscillator is a narrow clock pulse 122 which occurs each time capacitor 120 is charged. This output 122 toggles a downstream edge triggered flip-flop 124, generating an output signal 126 which is fed to an AND gate 128 which in turn gates the output signal 48 from the comparator 112 in order to generate an output signal 130 for cycling the downstream transistor 108. The output signal 126 from flip-flop 124 also is inverted and fed to an AND gate 132 to gate the output signal 48 from the comparator 112 in order to generate a signal 134 for cycling the transistor 110 on and off. In this manner, on and off cycling of the transistors 108, 110 is achieved as explained more fully in the Application Notes for the SG1524 from the 1980 Data Book by Silicon General Co. This generates a signal 135 (FIG. 5) for driving the lamp in a manner to be described below. Furthermore, as the capacitor 44 ramps up, the duty cycle of the signal 48 increases This signal gates the inputs to AND gates 128, 132 to increase the on times of the transistors 108, 110, and thereby progressively increase the current to the bulb.

In the present embodiment, overcurrent protection is provided by a transistor 136 (FIG. 6) having its collector tied to input 111a, its emitter tied to ground, and its base tied to the output of a differential amplifier 138 having inputs 140a, 140b, which are connected across a current sensing resistor 142. In the event of an overcurrent condition, the transistor 136 is turned on so that the capacitor 44 is discharged.

In operation, when transistor 108 (FIG. 4) is turned "on", a base terminal 143b of the transistor 38b goes low, turning transistor 38b on. Transistor 38b is biased by an upper resistor 144b and a lower resistor 146b which are connected at a node 148b which in turn is connected through a current limiting resistor 150b (and a parallel speed up capacitor 152b) to the base terminal 143b. In this configuration, an upper end of the upper resistor 144b is connected to the power input line 36 and the lower end of the lower resistor 146b is connected to the modulator collector terminal 102. Furthermore, the collector of transistor 38b is tied through a node 154 to the contact pad 24a of the socket assembly. In addition, a bypass resistor 156b is tied between the emitter and collector of the transistor 38b for reasons to be discussed later.

Meanwhile, with modulator transistor 108 still "on", the emitter current from modulator terminal 98 to the base terminal of transistor 38c causes it to turn on. In this configuration the emitter of common emitter transistor 38c tied to a return line 158 to the power supply, and the collector of transistor 38c is tied through a node 160 to contact pad 24c of the socket assembly. Transistor 38c is biased by a resistor 162c which has one end tied through a node 164c to modulator terminal 98 and its other end tied to the return line 158. The node 164c is tied through the current limiting resistor 150c to the base terminal.

At the same time that modulator transistor 108 is on, modulator transistor 110 is off. Therefore the voltage level at the base to transistor 38a is high (since there is no current through collector terminal 104), and transistor 38a is also off. As shown in FIG. 4, the base of transistor 38a is connected through resistors 150a, 146a to the modulator collector terminal 104, while the collector of transistor 38a is tied to contact pad 24c of the socket assembly via the node 160. In addition, with modulator transistor 110 off, there is a low voltage at the base to transistor 38d, causing it to be in an off state. Transistor 38d is configured so that its emitter is tied to the grounded power return line 158, while its collector is connected through the node 154 to contact pad 24a.

In the other mode of operation where modulator transistor 110 is on and modulator transistor 108 is off, the above described situation is reversed so that transistors 38a and 38d are turned on, and transistors 38b and 38c are turned off. In this manner current is fed through the bulb in an opposite direction indicated by the arrow 90.

In an exemplary embodiment where the present invention is part of a video system, resistor 118 (FIG. 6) and capacitor 120 (to the oscillator) are bypassed and the oscillator is clocked by an external signal via an external clock line 170 so that the switching of modulator transistors 108, 110 occurs at a video rate (approximately 15.75 kHz NTSC). This decreases the presence of circuit noise when the image is displayed as part of a video system.

Turning now to the remaining operation of the modulator chip (FIG. 4), the aforementioned charging capacitor 44 has one end tied to the return line 158 and its other end tied through a node 172 to the comparator input 111a (FIG. 6) of the modulator.

In order to discharge the capacitor 44 when the socket 16 is rotated from the "engaged" position, the node 172 is tied to the collector of a discharge transistor 174 which has its emitter tied to ground and its base tied to the collector of an upstream switching transistor 176. Discharge transistor 174 has its base biased via a line 177 which is tied to a voltage reference output 179 of the modulator through a resistor 181. The operation of the switching transistor 176 is controlled by rotation of the socket assembly between the "engaged" and "disengaged" positions. More specifically, the emitter of the switching transistor 176 is tied to ground, with a biasing resistor 178 tied between its base and emitter. Also tied to the base of transistor 176 is the downstream end of a current limiting resistor 180 which has its upstream end tied to an upper end of a charging capacitor 182. The other end of the charging capacitor 182 is tied to ground. In operation, as capacitor 182 charges up (as a consequence of the rotation of the socket 16 to the "engaged" position), it turns on switching transistor 176 which in turn shuts off discharge transistor 174 to allow capacitor 44 to charge up. On the other hand, when capacitor 182 is discharged due to movement of the socket from the "engaged" position, discharge transistor 174 is turned on, thereby discharging capacitor 44 and preventing it from charging up so that there is only a small potential between the contact pads 24 of the socket. Furthermore, the voltage at capacitor 44 is clamped by a diode 184 to a level set by a potentiometer indicated at 186 in order to limit the voltage across the light bulb 14.

Charging of capacitor 182 is accomplished only when the socket 16 is in the "engaged" position. More specifically, before start-up the capacitor 44 is in a discharged state and the transistor pairs 38a,38d and 38b,38c are "off". In this manner there is very little current which reaches the contact pads 24 when the socket is disengaged. Furthermore, the switches 38 and the portion of the circuit upstream of switches 38 are located away from the hole 26 in the circuit board 22 (FIG. 1) to prevent accidental contact during removal of the socket.

When the pads 24a and 24b are placed in mutual electrical contact by dimples 33 on prongs 32a and 32b, as well as the pads 24c and 24d placed in mutual electrical contact by dimples 33 on prongs 32c and 32d, a very small amount of current is fed around the transistors 38a, 38b via the bypass resistors 156a, 156b and nodes 154, 160, and on to contact pads 24a and 24c of the socket assembly. This current is then fed across to the pads 24b and 24d by the dimples 33 on socket prongs 32 and is discharged along interlock lines 190, 192 and through downstream blocking diodes 194, 196 and a downstream resistor 198 to charge up the capacitor 182. In the manner discussed previously, this shuts off discharge transistor 174 to allow the charging of capacitor 44.

It should be appreciated that as soon as the socket is rotated from the "engaged" position, the current through interlock lines 190, 192 is interrupted, allowing capacitor 182 to discharge to ground through resistors 180 and 178, and thereby turning on discharge transistor 174 to discharge capacitor 44. In the manner discussed previously, this interrupts power at the transistors 38 to the socket assembly.

What is claimed is:

1. Apparatus comprising:
   a mounting assembly for a light element, said assembly having a first portion with a first electrical contact and a second portion with a second electrical contact; said first portion having means for supporting a light element in electrical connection with said first contact, and said first portion being movable relative to said second portion between an engaged position wherein said first contact is placed in electrical communication with said second contact and a disengaged position wherein said electrical communication is absent;
   means for supplying a signal;
   switching circuit means, in electrical communication with said second contact and with said signal supplying means, responsive to said signal for supplying power from a source to said second contact to light said element when said first portion is in said engaged position and said signal is present;
   interlock circuit means, connected to said signal supplying means, for activating said signal supplying means to supply said signal to said switching circuit means when said interlock circuit means is placed in electrical communication with one of said first and second contacts, and for interrupting said signal when said communication is broken; and
   means for placing said interlock circuit means in electrical communication with said one of said first and second contacts when said first portion is moved to said engaged position, and for breaking said communication when said first portion is moved to said disengaged position.

2. Apparatus as in claim 1, wherein said means for supplying a signal comprises a capacitor, and wherein said interlock circuit means comprises means activating the charging of said capacitor when said first portion is moved to said engaged position and for activating the discharging of said capacitor when said first portion is moved to said disengaged position.

3. Apparatus as in claim 1, where said switching circuit means comprises means for supplying bypass current from the source to said second contact when said first portion is in said engaged position and said signal is absent; and wherein said interlock means comprises means for activating said signal supplying means in response to said bypass current.

4. Apparatus as in claim 3, wherein said capacitor is a first capacitor and wherein said interlock circuit means comprises a second capacitor and means activating the charging of said second capacitor when said first portion is moved to said engaged position and for activating the discharging of said second capacitor when said first portion is moved to said disengaged position.

5. Apparatus as in claim 4, wherein said switching circuit means comprises at least one transistor responsive to said charging of said first capacitor, and wherein said interlock circuit means further comprises at least one transistor responsive to said charging of said second capacitor.

6. Apparatus as in claim 4, wherein said switching circuit means further comprises a plurality of transistors, and wherein said signal supplying means further comprises a pulse width modulator circuit connected to said first capacitor and said plurality of transistors for providing power to said second contact in alternating current mode at progressively increasing rates of power when said first portion is initially moved to said engaged position.

7. Apparatus as in claim 1, where said second portion comprises a wall having first and second oppositely facing surfaces and an opening therethrough; said second contact is located adjacent said wall opening; said interlock circuit placing means comprises means placing said interlock circuit in communication with said second contact; said signal supplying means, said switching circuit means and said interlock circuit means are all located on the first surface side of said wall remotely from said opening; and wherein said first portion further comprises a socket member and means, bringable through said opening from the second surface side, for releasably locking said socket member in said engaged position to said wall.

8. Apparatus as in claim 1, wherein said switching circuit means and said signal supplying means cooperate for providing power at initially progressively greater rates to said second contact when said first portion is initially moved to said engaged position.

9. Apparatus as in claim 8, wherein said signal supplying means further comprises a modulator circuit; and wherein said switching circuit means is responsive to said modulator circuit for supplying power to said second contact in alternating current mode.

10. Apparatus as in claim 9, wherein said switching circuit means comprises a plurality of transistors connected for supplying a bypass current from the source to said second contact when said first portion is in said engaged position and said signal is absent.

11. Apparatus comprising:
an assembly for mounting a light bulb, said mounting assembly including a fixed portion and a movable portion with one of said portions having first and second electrical contacts and the other of said portions having a third electrical contact; the movable portion being movable between an engaged position in which said first and second contacts establish electrical connection with each other and with said third contact, and a disengaged position in which said established electrical connection is broken;
first switching means connected to one of said first and second contacts for controlling supply of electrical power from a source to said one contact; and
second switching means connected to the other of said first and second contacts, said second switching means being responsive to movement of said movable portion from said disengaged position to said engaged position for activating said first switching means to supply said electrical power to said one contact to light said bulb, and being responsive to movement of said movable portion from said engaged position to said disengaged position for deactivating said first switching means to keep said electrical power from reaching said one contact.

12. Apparatus as in claim 11, wherein said first switching means comprises modulator means for supplying said power from said source to said one contact at progressively greater rates of power when said movable portion is first moved to said engaged position.

13. Apparatus as in claim 12, wherein said first switching means further comprises means for supplying said power from a direct current mode source to said one contact in alternating current mode.

14. Apparatus as in claim 11, wherein said first switching means comprises a capacitor, and wherein said second switching means comprises means enabling the charging of said capacitor when said movable portion is brought into said engaged position and for enabling the discharge of said capacitor when said movable portion is brought into said disengaged position.

15. Apparatus as in claim 11, further comprising means for supplying bypass current to said one contact when said movable portion is first moved to said engaged position, and wherein said second switching means comprises means responsive to said bypass current for activating said first switching means for supplying said electrical power.

16. Apparatus as in claim 15, wherein said second switching means comprises a capacitor connected to be charged by said bypass current when said movable portion is first moved to said engaged position, and to be discharged when said movable portion is moved to said disengaged position.

17. Apparatus as in claim 11, wherein said fixed portion comprises a wall having first and second oppositely facing surfaces and an opening therethrough; said first and second switching means each comprise circuitry located on the first surface side of said wall remotely from said opening; and said movable portion comprises a socket member and means, bringable through said opening from the second surface side, for releasably locking said socket member in said engaged position to said wall.

18. Apparatus as in claim 17, wherein said socket member comprises a radially extending wing, said third contact is supported in radially extending position spaced out from said wing; said first and second contacts comprise first and second contact pads located on said first surface of said wall radially outward from said opening; and said socket member locking means comprises means for bringing said third contact through said opening to connect with both of said first and second contact pads, with said wing remaining on said second surface side.

19. Apparatus comprising:
an assembly for mounting a light bulb, said mounting assembly including a wall having first and second oppositely facing surfaces and an opening therethrough, with first and second pairs of contacts located on said first surface of said wall radially outward from said opening; and including a socket member having first and second radially extending wings with first and second contacts respectively supported in radially extending positions spaced out from said wings; said socket member being movable relative to said wall between an engaged position in which said first and second contacts are brought through said opening from the second surface side of said wall to establish electrical connection respectively with said first and second pairs of contacts, with said wings remaining on said second surface side to releasably lock said socket member to said wall, and a disengaged position in which said established electrical connection is broken and said socket member is separated from said wall;

first switching means, including a capacitor, connected to one contact of each of said pairs of contacts for controlling supply of electrical power from a source to said one contacts in accordance with charging of said capacitor; and second switching means connected to said other contact of each of said pairs of contacts, said second switching means being responsive to movement of said socket member from said disengaged to said engaged position for causing the charging of said capacitor for activating said first switching means to supply said electrical power to said one contacts to light said bulb, and being responsive to movement of said socket member from said engaged to said disengaged position for causing the discharging of said capacitor for deactivating said first switching means to remove said electrical power from said one contacts.

20. Apparatus as in claim 19, wherein said first switching means further comprises a modulator circuit connected to said capacitor for supplying said power in alternating current mode from said source to said one contacts at initially progressively increasing rates of power, and wherein said modulator circuit and said capacitor are located on said first surface side of said wall remotely from said opening.

* * * * *